(12) United States Patent
Almqvist et al.

(10) Patent No.: US 11,305,405 B2
(45) Date of Patent: Apr. 19, 2022

(54) CUTTER CLAMP, AN ATTACHMENT DEVICE, A CUTTER CLAMP KIT AND A HOLDING FRAME

(71) Applicant: HUSQVARNA AB, Huskvarna (SE)

(72) Inventors: Torbjörn Almqvist, Gothenburg (SE); Robert Lerbro, Floda (SE); Pär Carlsson, Gothenburg (SE)

(73) Assignee: Husqvarna AB, Huskvarna (SE)

(*) Notice: Subject to any disclaimer, the term of this patent is extended or adjusted under 35 U.S.C. 154(b) by 50 days.

(21) Appl. No.: 16/640,867

(22) PCT Filed: May 2, 2018

(86) PCT No.: PCT/SE2018/050449
§ 371 (c)(1),
(2) Date: Feb. 21, 2020

(87) PCT Pub. No.: WO2019/045614
PCT Pub. Date: Mar. 7, 2019

(65) Prior Publication Data
US 2020/0189070 A1    Jun. 18, 2020

(30) Foreign Application Priority Data

Aug. 28, 2017 (SE) .................................. 1751027-2

(51) Int. Cl.
    *B25B 5/00*     (2006.01)
    *B25B 5/14*     (2006.01)
    *B25B 5/10*     (2006.01)

(52) U.S. Cl.
    CPC ................. *B25B 5/147* (2013.01); *B25B 5/10* (2013.01)

(58) Field of Classification Search
CPC .. B25B 5/00; B25B 5/10; B25B 5/147; B25B 27/00; B23P 19/00; B23P 19/10
See application file for complete search history.

(56) References Cited

U.S. PATENT DOCUMENTS

| 1,075,384 A | 10/1913 | Seidel. |
| 1,086,574 A | 2/1914 | Anderson. |

(Continued)

FOREIGN PATENT DOCUMENTS

| AT | 505753 A4 | 4/2009 |
| CH | 639588 A5 | 11/1983 |

(Continued)

OTHER PUBLICATIONS

Swedish Search Report for Application No. 1751027-2 dated Mar. 14, 2018.

(Continued)

*Primary Examiner* — Lee D Wilson
(74) *Attorney, Agent, or Firm* — Burr & Forman, LLP

(57) ABSTRACT

The present disclosure relates to a cutter clamp (8, 37) that comprises a first arm part (10, 39) and a second arm part (11, 40), where the arm parts (10, 11; 39, 40) are arcuate and arranged to adjustably at least partially enclose a major part of a circumference (57, 63) having a center (58, 64). The cutter clamp (8, 37) comprises at least one hollow rod (21, 22; 48, 62) arranged for receiving a mounting rod (36) for a power cutter (1, 56) in a pivoting manner. The smaller circumference the arm parts (10, 11; 39, 40) are adjusted for, the closer to the center (58, 64) said hollow rod (21, 22; 48, 62) is moved. The present disclosure also relates to a cutter clamp attachment device (68), a cutter clamp kit and a cutter clamp holding frame (76).

16 Claims, 12 Drawing Sheets

(56) References Cited

U.S. PATENT DOCUMENTS

| | | | |
|---|---|---|---|
| 2,567,833 A | 9/1951 | Warren et al. | |
| 2,870,536 A | 1/1959 | Lutsker | |
| 2,890,906 A | 6/1959 | Jacquart | |
| 3,974,596 A | 8/1976 | Huboud-Peron | |
| 4,068,415 A | 1/1978 | McIlrath | |
| 4,156,991 A | 6/1979 | McIlrath | |
| 4,278,246 A * | 7/1981 | Blake | B25B 5/103 269/220 |
| 4,682,919 A | 7/1987 | Mitchell | |
| 4,689,883 A | 9/1987 | Dent | |
| 5,107,594 A | 4/1992 | Ferreras | |
| 5,545,079 A | 8/1996 | Larsson et al. | |
| 6,619,171 B2 | 9/2003 | Wade et al. | |
| 7,703,211 B1 | 4/2010 | Kirchhoff | |
| 8,357,872 B2 | 1/2013 | Lier | |
| 8,720,070 B2 | 5/2014 | Sterner | |
| 9,843,654 B2 | 12/2017 | Vermani et al. | |
| 2007/0238398 A1 | 10/2007 | McGivery | |
| 2011/0062126 A1 | 3/2011 | Lier | |
| 2015/0040736 A1 | 2/2015 | Yancey | |
| 2017/0190034 A1* | 7/2017 | Blackford | B25H 1/0014 |
| 2020/0189070 A1* | 6/2020 | Almqvist | B23D 45/12 |

FOREIGN PATENT DOCUMENTS

| | | |
|---|---|---|
| CN | 101758294 A | 6/2010 |
| CN | 107052692 A | 8/2017 |
| DE | 495132 C | 4/1930 |
| DE | 35 21 697 A1 | 2/1986 |
| DE | 9417353 U1 | 1/1995 |
| DE | 19614611 A1 | 10/1997 |
| DE | 10229671 A1 | 1/2003 |
| DE | 202009014060 U1 | 2/2010 |
| DE | 202010008463 U1 | 12/2011 |
| DE | 102011080450 A1 | 2/2013 |
| DE | 102013101046 A1 | 8/2014 |
| EP | 0062188 A2 | 10/1982 |
| EP | 0427453 B1 | 2/1995 |
| EP | 1301311 B1 | 9/2005 |
| EP | 1236551 B1 | 10/2007 |
| EP | 1628797 B1 | 7/2010 |
| EP | 2907609 A2 | 8/2015 |
| EP | 2729272 B1 | 12/2015 |
| EP | 2939775 B1 | 8/2016 |
| EP | 2804468 B1 | 9/2017 |
| FI | 990167 A | 7/2000 |
| JP | 61031613 U | 2/1986 |
| JP | 6165718 B2 | 7/2017 |
| RU | 1838054 C | 8/1993 |
| WO | 2004/103623 A1 | 12/2004 |
| WO | 2011067262 A1 | 6/2011 |
| WO | 2013/070203 A2 | 5/2013 |
| WO | 2016012776 A1 | 1/2016 |
| WO | 2017/168057 A1 | 10/2017 |

OTHER PUBLICATIONS

International Search Report and Written Opinion for International Application No. PCT/SE2018/050449 dated Jun. 25, 2018.
International Preliminary Report on Patentability for International Application No. PCT/SE2018/050449 dated Mar. 3, 2020.

* cited by examiner

CUTTER CLAMP, AN ATTACHMENT DEVICE, A CUTTER CLAMP KIT AND A HOLDING FRAME

TECHNICAL FIELD

The present disclosure relates to a cutter clamp that comprises a first arm part and a second arm part, where the arm parts are arcuate and arranged to adjustably at least partially enclose a major part of a circumference having a center. The cutter clamp comprises at least one hollow rod arranged for receiving a mounting rod for a power cutter in a pivoting manner.

The present disclosure also relates to an attachment device adapted for attaching a mounting part to a power transfer cover for a power cutter.

The present disclosure also relates to a holding frame adapted to be attached to a ring saw.

BACKGROUND

When a pipe or similar is to be cut, for example during construction or due to a water leak, a cutting fixture in the form of a cutter clamp is mounted to the pipe and is connected to a power cutter, for example a suitable chain saw. The cutter clamp is normally in the form of a claw arrangement with a three-point grip that is mounted such that it partly circumvents the pipe to which it is mounted. The power cutter is then connected to the cutting fixture such that it is held in a pivoting manner, for example as described in US 20150040736. This results in stable and fixed working positions and provides a straight cut.

There is, however, a risk of kick-back of the guide bar, which it is desired to prevent. It is also desired to enable the use of a power cutter with a smaller guide bar, which in turn enables an easier handling of the power cutter and the cutting process.

It is therefore desired to provide a cutter clamp that decreases the risk of kick-back of the guide bar, and which enables the use of a power cutter with a smaller guide bar.

It is also desired to provide a cutter clamp that is versatile and possible to use for different types of power cutters.

It is also desired to provide suitable means for attaching a cutter clamp to a power cutter.

SUMMARY

It is an object of the present disclosure to provide a cutter clamp that prevents kick-back of the guide bar, and which enables the use of a power cutter with a smaller guide bar.

This object is achieved by means of a cutter clamp that comprises a first arm part and a second arm part, where the arm parts are arcuate and arranged to adjustably at least partially enclose a major part of a circumference having a center. The cutter clamp comprises at least one hollow rod arranged for receiving a mounting rod for a power cutter in a pivoting manner. The smaller circumference the arm parts are adjusted for, the closer to the center said hollow rod is moved.

This provides an advantage related to that a shorter guide bar can be used, resulting in a saw that is easier to handle and where the risk of kick-back of the guide bar is reduced, also enabling an enhanced cutting angle.

According to some aspects, the cutter clamp comprises a locking screw that is rotatably attached to a first screw holder and is arranged to engage threads comprised in a second screw holder such that turning the locking screw enables the adjustment of the arm parts.

This provides an advantage related to that the cutter clamp can be easily adjusted.

According to some aspects, the cutter clamp comprises a first intermediate part and a second intermediate part, where the intermediate parts connect the arm parts. The locking screw at least partly runs via the intermediate parts.

This provides an advantage related to that the locking screw runs in a rigid manner such that a secure clamping of a pipe can be obtained.

According to some aspects, when the arm parts are adjusted, each hollow rod moves relative the rest of the cutter clamp by sliding in a corresponding elongated slot formed in a corresponding arm part.

This provides an advantage related to that a symmetrical clamping arrangement is provided.

According to some aspects, the arm parts comprise a corresponding first end and second end, where a first arm second end is attached to the second arm in a pivoting manner by means of an arm attachment rod between a second arm first end and a second arm second end.

This provides an advantage related to that an uncomplicated cutter clamp is provided.

It is also an object of the present disclosure to provide a cutter clamp that is versatile and possible to use for different types of power cutters.

This object is achieved by means of a cutter clamp that comprises a first arm part and a second arm part, where the arm parts are arcuate and arranged to adjustably at least partially enclose a major part of a circumference having a center. The cutter clamp comprises one hollow rod arranged for receiving a mounting rod for a power cutter in a pivoting manner. The cutter clamp comprises a locking screw that is rotatably attached to a first screw holder and is arranged to engage threads comprised in a second screw holder such that turning the locking screw enables the adjustment of the arm parts. The arm parts comprise a corresponding first end and second end, where a first arm second end is attached to the second arm in a pivoting manner by means of an arm attachment rod between a second arm first end and a second arm second end. The hollow rod is positioned between the first screw holder and the second arm second end.

This provides an advantage related to that a cutter clamp that is versatile and possible to use for different types of power cutters, such as a ring saw, is provided.

According to some aspects, the second arm part comprises the first screw holder positioned between the first arm second end and the second arm second end, where the first arm part comprises an attachment rod that is attached to the second screw holder.

This provides an advantage related to that the locking screw runs in a rigid manner such that a secure clamping of a pipe can be obtained.

It is also an object of the present disclosure to provide suitable means for attaching a cutter clamp to a power cutter.

This object is achieved by means of an attachment device adapted for attaching a mounting part to a power transfer cover for a power cutter. The attachment device comprises a first leg part and a second leg part, which leg parts are separated by an intermediate part. The mounting part is attached to the first leg part, where furthermore the leg parts are adapted to be positioned on opposite sides of the power transfer cover such that at least one leg part is received and retained by a corresponding leg holding arrangement.

This object is also achieved by means of a cutter clamp kit that comprises a cutter clamp and a power transfer cover according to the above.

This object is also achieved by means of a holding frame adapted to be attached to a ring saw. The holding frame comprises a first leg part and a second leg part which leg parts are separated by an intermediate part. The leg parts are adapted to be fastened to a ring saw on opposite sides of the ring saw with respect to a cutting plane of a ring saw blade. The holding frame comprises an attachment flange that is attached to the first leg part, where the attachment flange is arranged to be releasably attached to a mounting rod that is adapted to be connected to a cutter clamp according to the above.

This provides an advantage related to that an uncomplicated and easily attachable means for attaching a cutter clamp to a ring saw is provided. The holding frame is versatile since the mounting rod is releasably attachable.

This object is also achieved by means of a holding frame adapted to be attached to a ring saw. The holding frame comprises a first leg part and a second leg part which leg parts are separated by an intermediate part. The leg parts are adapted to be fastened to a ring saw on opposite sides of the ring saw with respect to a cutting plane of a ring saw blade. The holding frame comprises a mounting rod that is directly attached to the first leg part in a fixed manner, where the mounting rod is adapted to be connected to a cutter clamp according to the above.

This provides an advantage related to that an uncomplicated and easily attachable means for attaching a cutter clamp to a ring saw is provided. The holding frame is rigid since the mounting rod is mounted to the first leg part in a fixed manner.

BRIEF DESCRIPTION OF THE DRAWINGS

The present disclosure will now be described more in detail with reference to the accompanying figures wherein.

DETAILED DESCRIPTION

Figure 1:
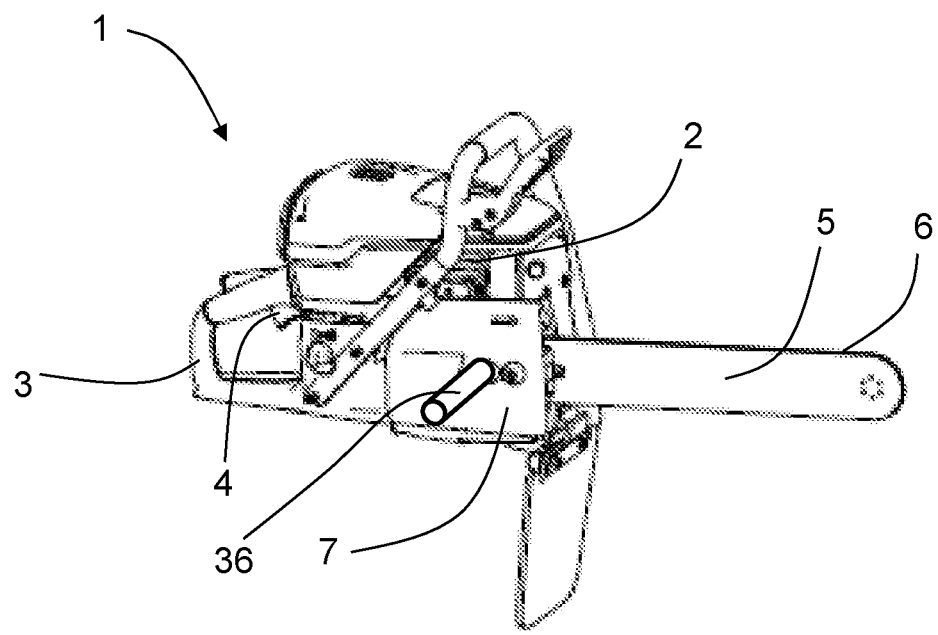
FIG. 1 shows a perspective view of a chain saw.

As shown in FIG. 1, there is power cutter, here in the form of a chain saw 1, that comprises a motor 2, a handle 3 with a power control 4, a guide bar 5 with a saw chain 6 and a clutch cover 7 that is arranged to cover a power transferring arrangement that is adapted to transfer power from the motor 2 to the saw chain 6, suitably in the form of a clutch and a transmission.

Figure 2:
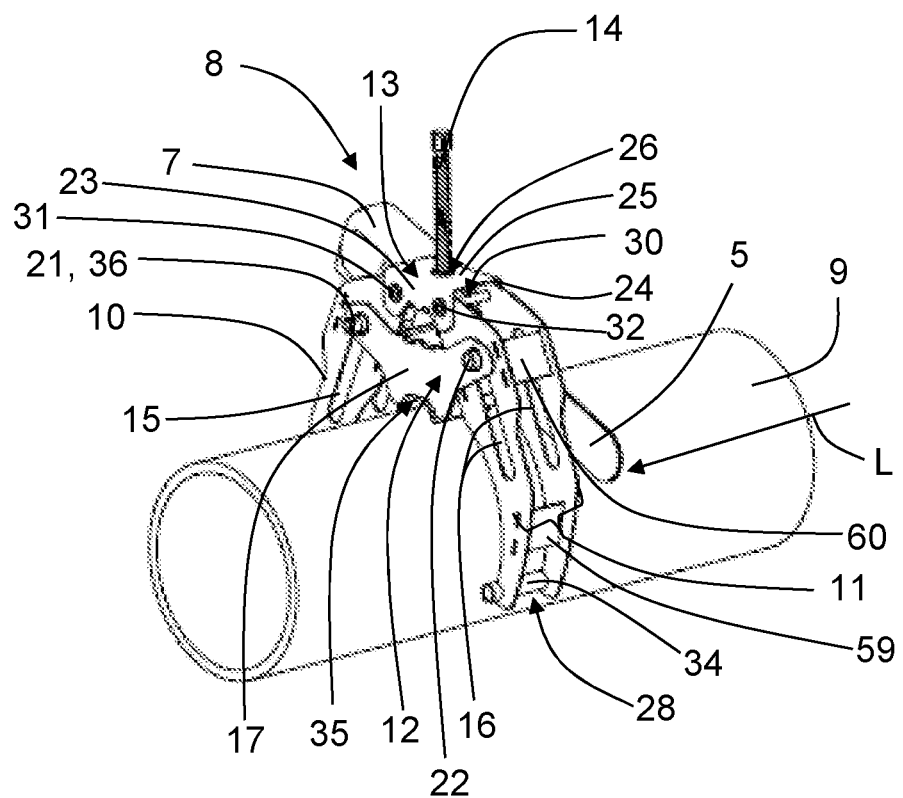
FIG. 2 shows a perspective side view of a cutter clamp according to a first example that is attached to a pipe.
Figure 3:
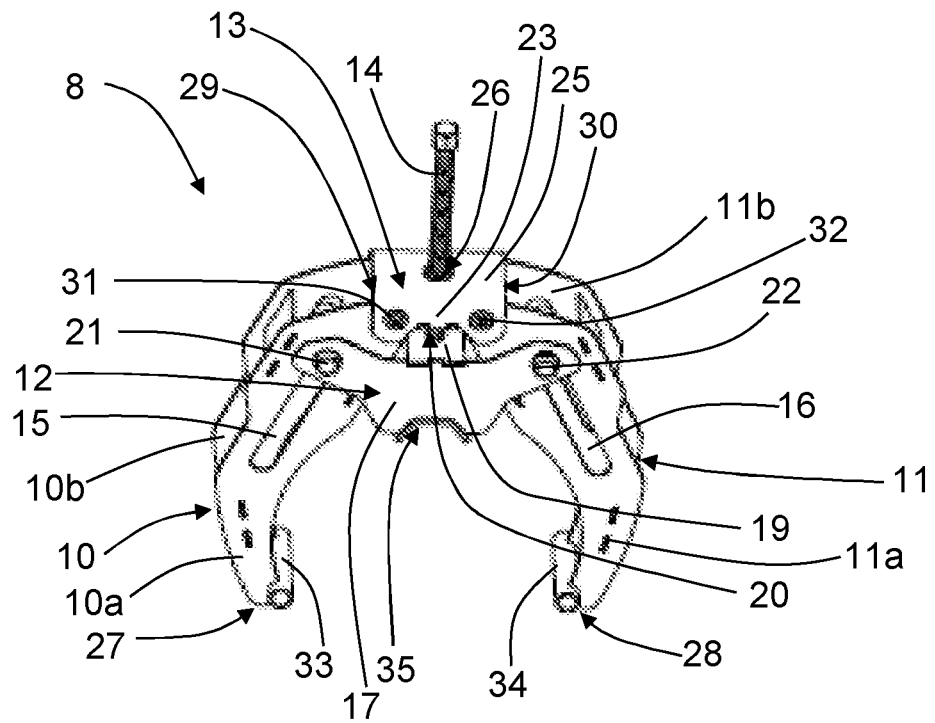
FIG. 3 shows a top perspective view of a cutter clamp according to a first example.
Figure 4:
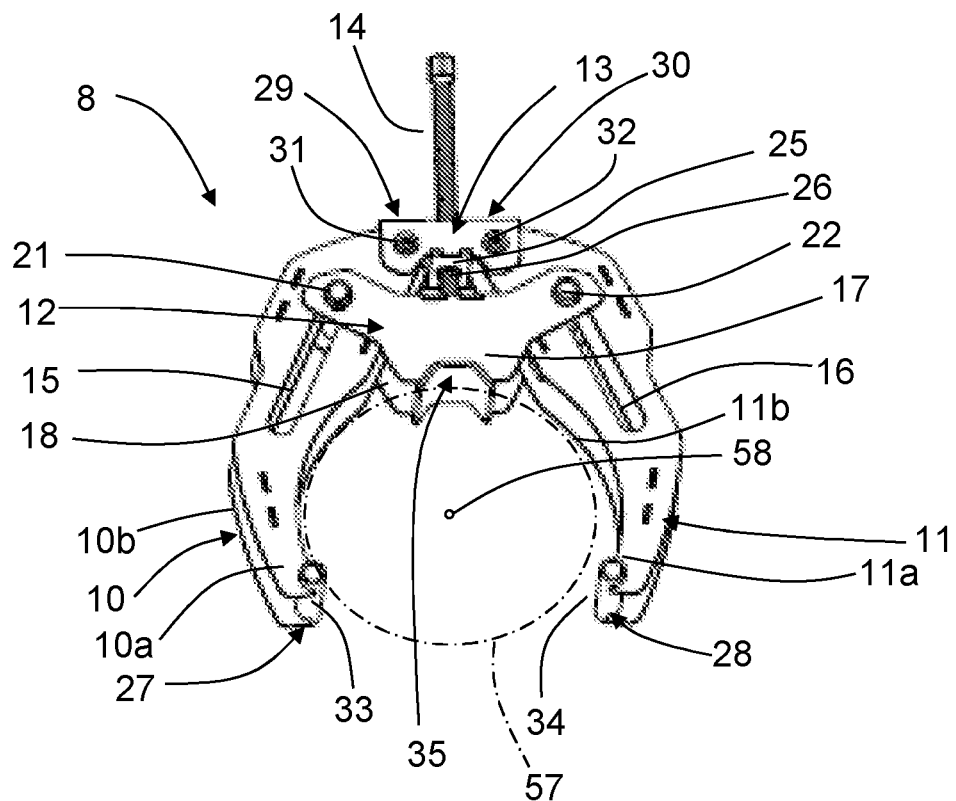
FIG. 4 shows bottom perspective view of a cutter clamp according to a first example.
Figure 5:
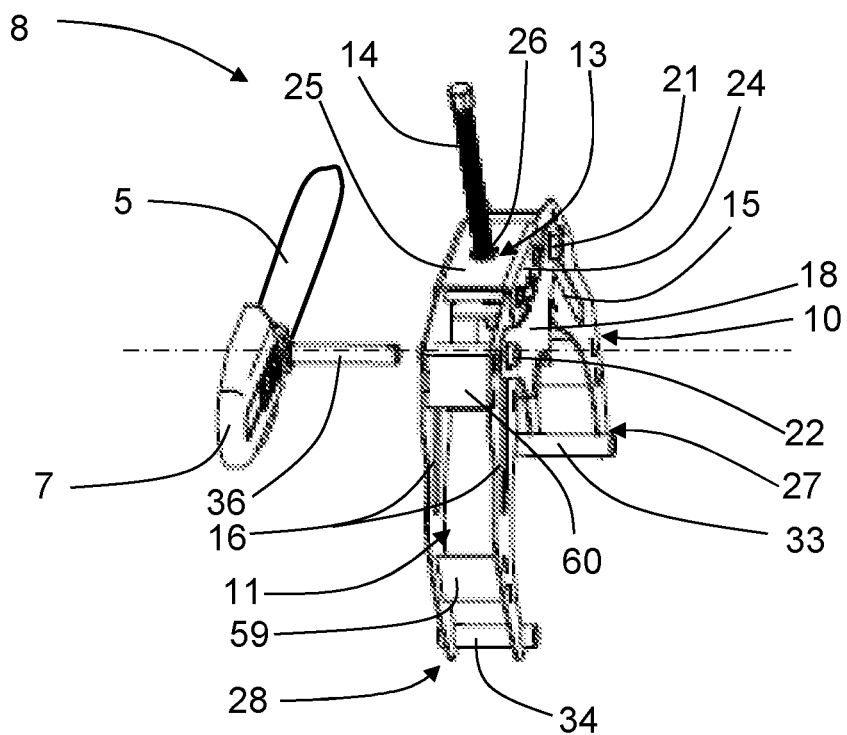
FIG. 5 shows side perspective view of a cutter clamp according to a first example with a guide bar mounted.

With reference to FIG. 2, FIG. 3, FIG. 4 and FIG. 5, a first example of a cutter clamp will be described. FIG. 2 shows a perspective side view of a cutter clamp 8 that is attached to a pipe 9, FIG. 3 shows a top perspective view of a cutter clamp 8, FIG. 4 shows a bottom perspective view of a cutter clamp 8, and FIG. 5 shows a side perspective view of a cutter clamp 8 with a guide bar mounted. Due to different perspectives and levels of detailing, all Figures mentioned above do not show all details.

The cutter clamp 8 comprises a first arcuate arm part 10 and a second arcuate arm part 11, where the arm parts 10, 11 are arcuate such that they are arranged to adjustably embrace and at least partially enclose a major part of a circumference 57 having a center 58. The arm parts 10, 11 comprise a corresponding first end 27, 28 and second end 29, 30, where the first ends 27, 28 are arranged to be located closer to the pipe 9 than the second ends 29, 30 when the cutter clamp 8 is attached to a pipe 9. The cutter clamp 8 further comprises a first intermediate part 12, a second intermediate part 13 and a locking screw 14, where the intermediate parts 12, 13 connect the arm parts 10, 11, and where the locking screw 14 runs through the intermediate parts 12, 13. The first intermediate part 12 is arranged to be located closer to the first ends 27, 28 than the second intermediate part 13. The circumference 57 and center 58 are only imaginary and are only shown in FIG. 4; the circumference 57 can according to some aspects represent an outer circumference of a pipe.

The arm parts 10, 11 are sandwiched between outer plates 17, 18 of the first intermediate part 12, which outer plates 17, 18 are separated in an extension L, and are connected by a first screw holder 19 that comprises a aperture 20 for receiving the and retaining an end of the locking screw 14 in a rotatable manner, and two connecting hollow rods; a first connecting hollow rod 21 and a second connecting hollow rod 22 that run mutually parallel along the extension L. The first arm part 10 comprises a first elongated slot 15 and the second arm part 11 comprises a second elongated slot 16, where the first hollow rod 21 runs through the first elongated slot 15 and the second hollow rod 22 runs through the second elongated slot 16. When a pipe 9 is attached to the cutter clamp 8, it has a longitudinal extension that coincides with the extension L.

The arm parts 10, 11 are also sandwiched between outer plates 23, 24 of the second intermediate part 13, which outer plates 23, 24 are separated in the extension L and are connected by a second screw holder 25 and connecting rods, a first connecting rod 31 and a second connecting rod 32. The second screw holder 25 comprises a threaded aperture 26 for receiving the locking screw 14, and the connecting rods 31, 32 connect the arm parts 10, 11 in a pivoting manner.

The cutter clamp 8 is arranged to contact a pipe by means of contact rods 33, 34 attached to the first ends 27, 28 of the arm parts 10, 11 and by means of a contact plate 35 connected to the outer plates 17, 18 of the first intermediate part 12. When the locking screw 14 is rotated, the end that is retained in the first screw holder 19 rotates and is moved towards or away from the second screw holder 25 since the locking screw 14 engages threads in the threaded aperture 26. This means that the end that is retained in the first screw holder 19 is rotatably secured to the first screw holder 19, such that the relative position of the locking screw 14 and the screw holder 19 is maintained upon rotation of the screw.

Figure 6:
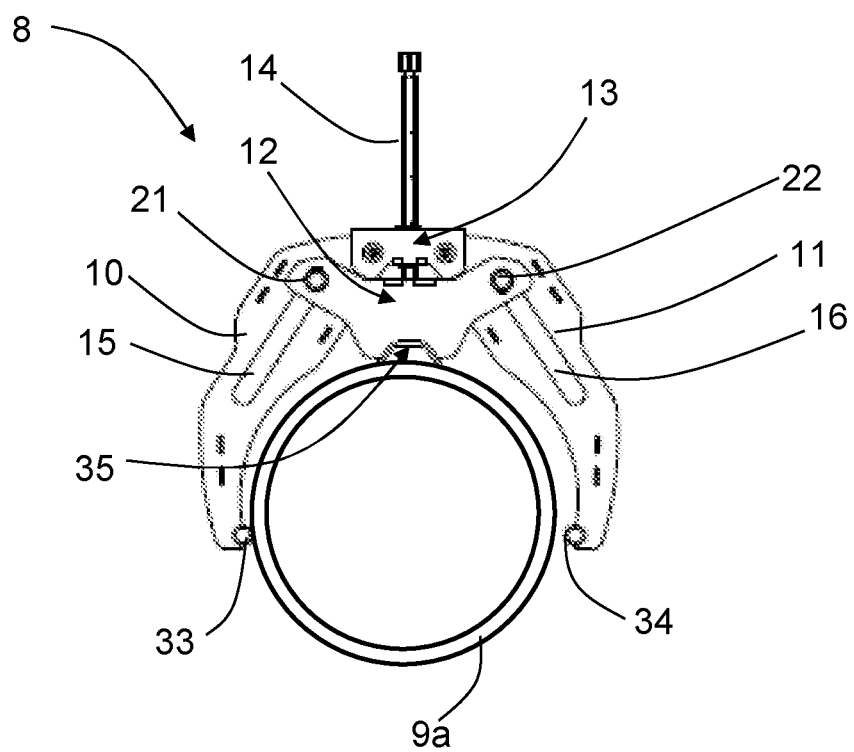
FIG. 6 shows a front view of a cutter clamp according to a first example that is adapted for a first pipe dimension.
Figure 7:
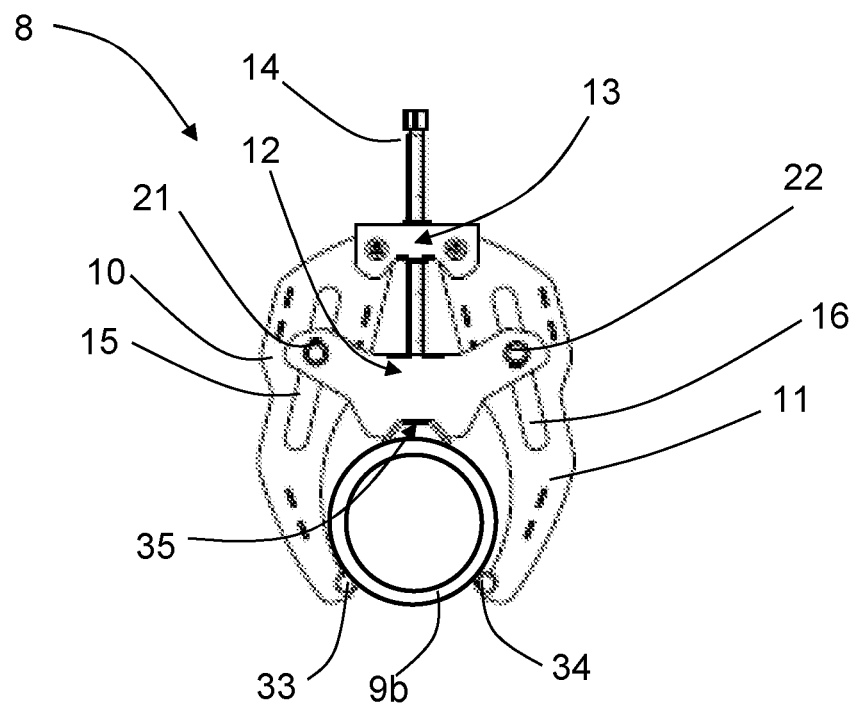
FIG. 7 shows a front view of a cutter clamp according to a first example that is adapted for a second pipe dimension.

In this manner, with reference also to FIG. 6 and FIG. 7 showing the cutter clamp 8 adapted for two different pipe dimensions 9a, 9b, for a first direction of rotation of the locking screw 14, the contact surface 35 is brought closer to the contact rods 33, 34, and the contact rods are brought closer to each other. The connecting hollow rods 21, 22 then slide in the corresponding elongated slots 15, 16 towards the second intermediate part 13. For an opposite second direction of rotation of the locking screw 14, the contact surface 35 is brought away from the contact rods 33, 34, and the contact rods 33, 34 are brought away from each other. The connecting hollow rods 21, 22 then slide in the corresponding elongated slots 15, 16 away from the second intermediate part 13. For the first direction of rotation, if a pipe 9, 9a, 9b would be positioned in the cutter clamp 8, the contact surface 35 and the contact rods 33, 34 would be brought into contact with the pipe 9, 9a, 9b, holding the pipe. For the second direction of rotation, a retained pipe 9, 9a, 9b would be released.

The chain saw 1 is arranged to be attached to the cutter clamp 8 in such a way that stable and fixed working positions are obtained, enabling a straight cut, as will be described more in detail in the following. For this purpose, the chain saw 1 comprises a mounting rod 36 that is arranged to be attached to the cutter clamp 8.

According to the present disclosure, in particular as shown in FIG. 2 and also FIG. 5, the cutter clamp 8 is arranged for receiving the mounting rod 36 of a chain saw in one of the connecting hollow rods 21, 22, such that the mounting rod 36 runs through a connecting hollow rod 21, 22, enabling the chain saw to pivot. For reasons of clarity, where applicable, with the exception of FIG. 1, only the guide bar 5 and the clutch cover 7 are shown in the Figures, not the whole chain saw 1, even if the chain saw is to be understood to be present in its entirety.

The hollow rods 21, 22 here constitute attachment points, and in this example, as illustrated for two different pipe dimensions in FIG. 6 and FIG. 7, the attachment points 21, 22 move since the hollow rods 21, 22 slide in the elongated slots 15, 16. The smaller the pipe is, the closer the contact surface 35 and the attachment points are brought to the contact rods 33, 34, the positions of the attachment points along the elongated slots 15, 16 thus being automatically adapted to the current pipe dimension. When a larger pipe dimension is used, as illustrated in FIG. 6, the attachment points 21, 22 have been brought to a position in the elongated slots 15, 16 where the contact surface 35 is brought farther from the contact rods 33, 34 than when a smaller pipe dimension is used, as illustrated in FIG. 7. By sliding in the elongated slots 15, 16 when the cutter clamp 8 is tightened against the current pipe, the attachment points 21, 22 and the contact surface 35 adjusts to the current pipe dimension in an automatic manner.

Figure 8:
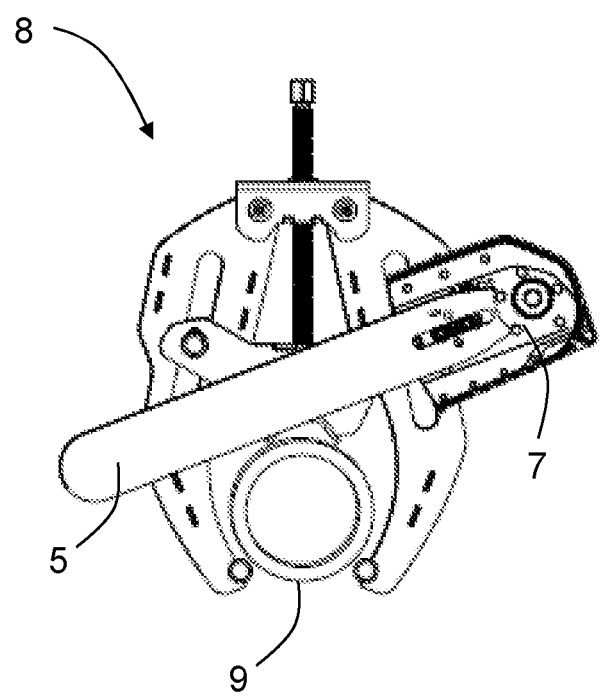
FIG. 8 shows a front view of a cutter clamp according to a first example where a mounted guide bar is pivoted in a first position.
Figure 9:
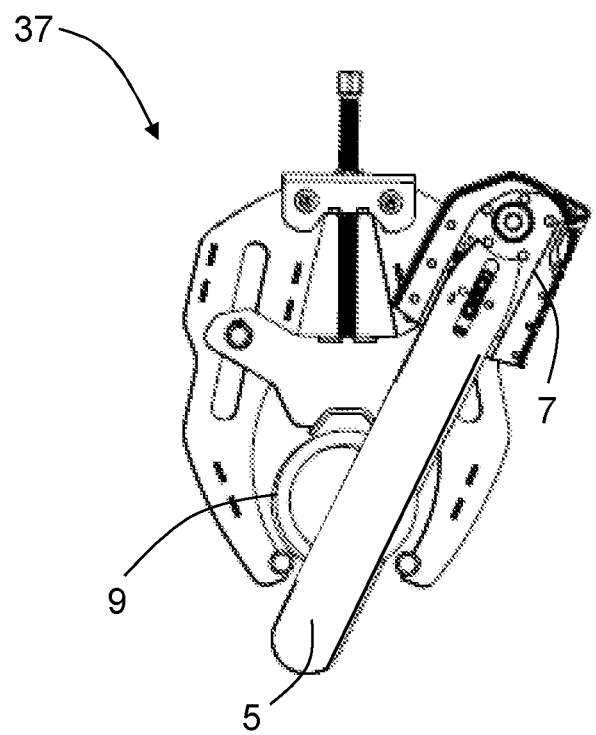
FIG. 9 shows a front view of a cutter clamp according to a first example where a mounted guide bar is pivoted in a second position.

When the chain saw 1 is attached to the cutter clamp 8, the guide bar 5 and thus the whole chain saw 1 can be pivoted such that it cuts the pipe 9 in a desired manner as shown in FIG. 8 and FIG. 9.

By means of the present disclosure, a shorter guide bar can be used, resulting in a saw that is easier to handle and where the risk of kick-back of the guide bar is reduced, having an enhanced cutting angle. A shorter guide bar is enabled since the guide bar 5 always is relatively close to the pipe that is to be cut due to the fact that the attachment points 21, 22 and the contact surface 35 adjusts to the current pipe dimension as described above.

The arcuate arm parts 10, 11 are in the above each constituted by two arm plates 10a, 10b; 11a, 11b that are separated along the extension L, as in particular shown in FIG. 3 and FIG. 4, and are held in positions by means of the contact rods 33, 34 and additional arm plate holders 59, 60 as illustrated in FIG. 1 and FIG. 5. The arcuate arm parts may of course be made in many other ways, for example in one piece of material.

Figure 10:
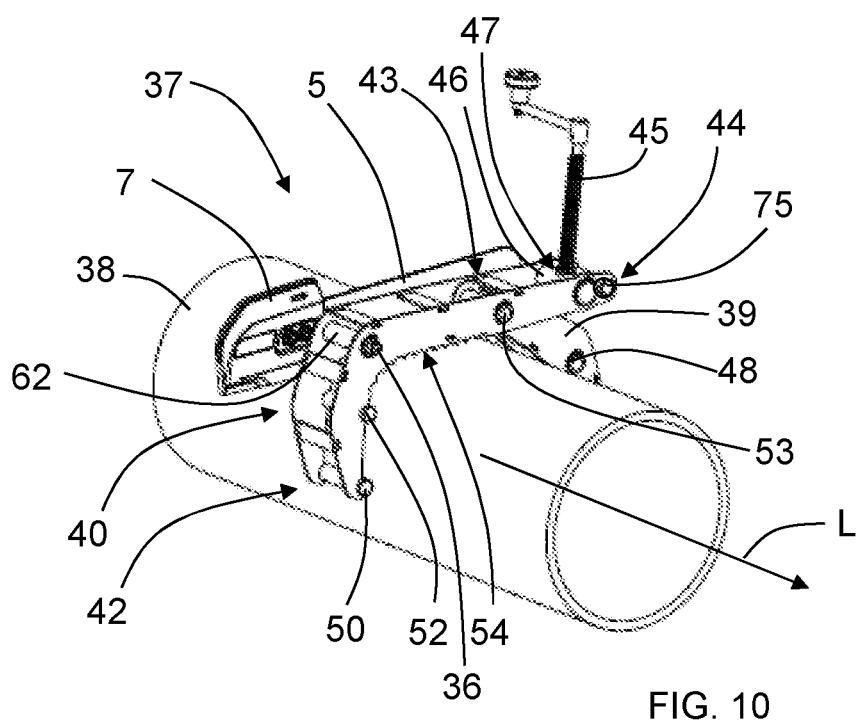
FIG. 10 shows a perspective side view of a cutter clamp according to a second example that is attached to a pipe.
Figure 11:
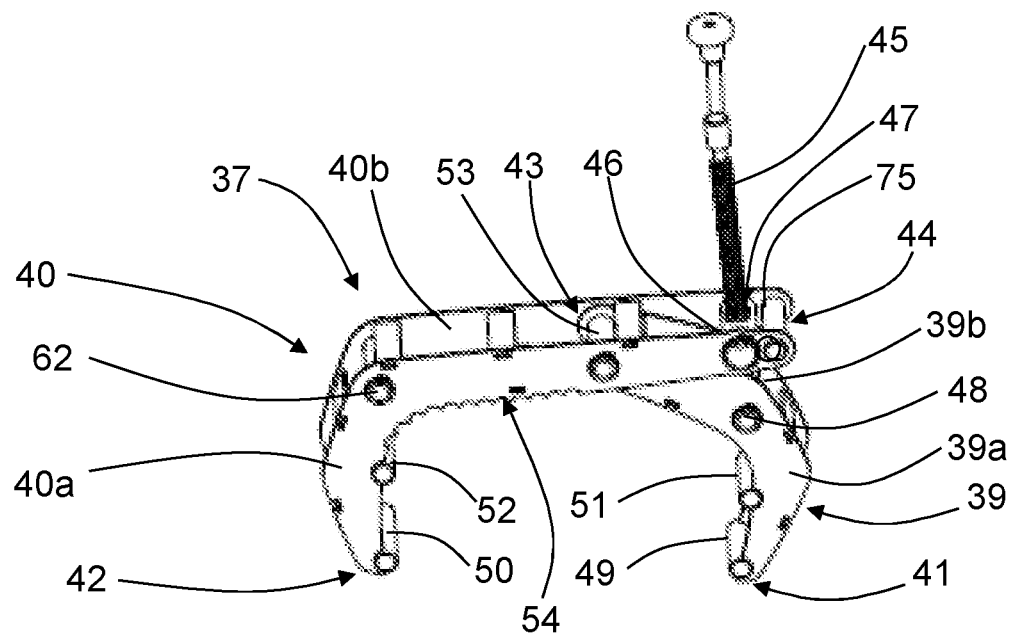
FIG. 11 shows a top perspective view of a cutter clamp according to a second example.
Figure 12:
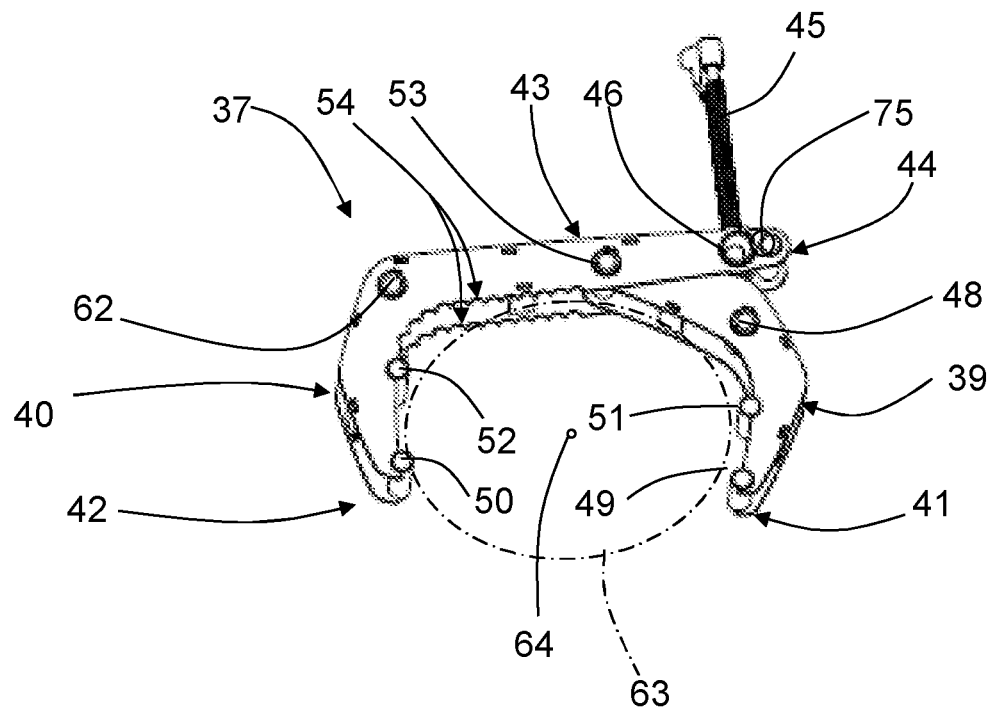
FIG. 12 shows bottom perspective view of a cutter clamp according to a second example.
Figure 13:
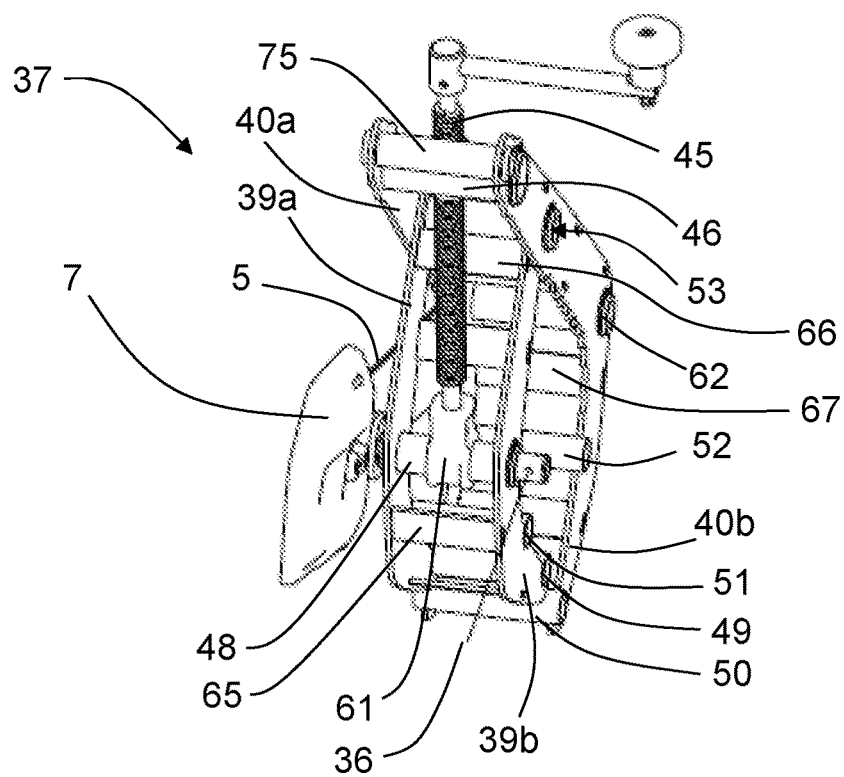
FIG. 13 shows side perspective view of a cutter clamp according to a second example with a guide bar mounted.

With reference to FIG. 1, FIG. 10, FIG. 11, FIG. 12 and FIG. 13, a second example of a cutter clamp will be described. FIG. 10 shows a perspective side view of a cutter clamp 37 that is attached to a pipe 38, FIG. 11 shows a top perspective view of a cutter clamp 37, FIG. 12 shows a bottom perspective view of a cutter clamp 37 and FIG. 13 shows a side perspective view of a cutter clamp 37 with a guide bar mounted. Due to different perspectives and levels of detailing, all Figures mentioned above do not show all details.

The cutter clamp 37 comprises a first arcuate arm part 39, a second arcuate arm part 40 and a locking screw 45, where the arm parts 39, 40 are arcuate such that they are arranged to adjustably embrace and at least partially enclose a major part of a circumference 63 having a center 64. The arm parts 39, 40 comprise a corresponding first end 41, 42 and second end 43, 44, where a first arm second end 43 is attached to the second arm 40 in a pivoting manner by means of an arm attachment rod 53 between a second arm first end 42 and a second arm second end 44.

The second arm part 40 comprises a first screw holder in the form of a pivoting rod 46 that in turn comprises a threaded aperture 47 arranged for receiving the locking screw 45, where the pivoting rod 46 is positioned between the first arm second end 43 and the second arm second end 44. The first arm part 39 comprises a hollow pivoting rod 48 that in turn is attached to a second screw holder 61 adapted for receiving and retaining an end of the locking screw 45 in a rotatable manner. When a pipe 38 is attached to the cutter clamp 37, it has a longitudinal extension that coincides with an extension L.

The circumference 63 and center 64 are only imaginary and are only shown in FIG. 12; the circumference 63 can according to some aspects represent an outer circumference of a pipe.

The cutter clamp 37 is arranged to contact a pipe by means of outer contact rods 49, 50 attached to the first ends 41, 42 of the arm parts 39, 40, or intermediate contact rods 51, 52. The intermediate contact rods 51, 52 are attached between the first ends 41, 42 of the arm parts 39, 40 and the arm attachment rod 53. The cutter clamp 37 is according to some aspects arranged to contact a pipe by means of means of contact teeth 54 comprised in the second arm part 40. When the locking screw 45 is rotated, the end that is retained in the hollow pivoting rod 48 rotates and is moved towards or away from the pivoting rod 46 since the locking screw 45 engages threads in the threaded aperture 47.

In this manner, for a first direction of rotation of the locking screw 45, initially the outer contact rods 49, 50 are brought closer to each other, and the intermediate contact rods 51, 52 are also brought closer to each other, and finally a first arm outer contact rod 49 is brought past a second arm outer contact rod 50 and towards a second arm intermediate contact rod 52.

Figure 14:
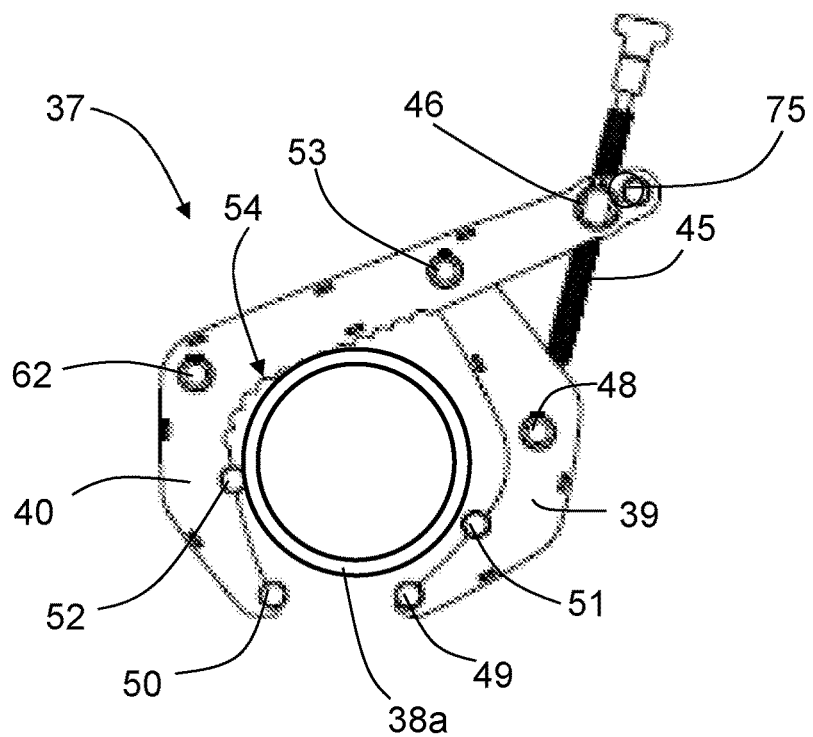
FIG. 14 shows a front view of a cutter clamp according to a second example that is adapted for a first pipe dimension.
Figure 15:
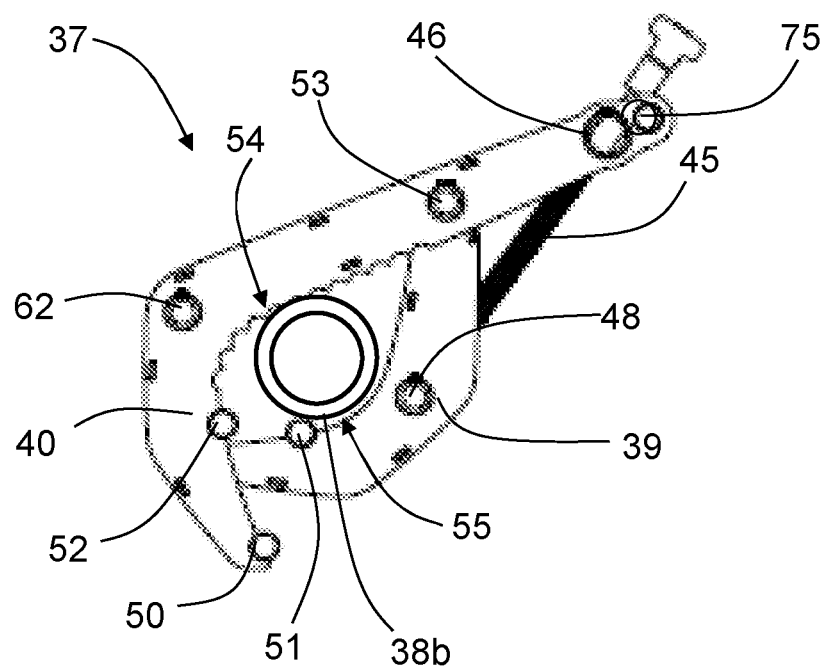
FIG. 15 shows a front view of a cutter clamp according to a second example that is adapted for a second pipe dimension.

This is illustrated for three different pipe dimensions 38, 38a, 38b in FIG. 10, FIG. 14 and FIG. 15. In FIG. 10, for the first direction of rotation, the outer contact rods 49, 50 and the contact teeth 54 are brought into contact with the pipe 38, holding the pipe 38. In FIG. 14, for the first direction of rotation, the intermediate contact rods 51, 52 and the contact teeth 54 are brought into contact with the pipe 38a, holding the pipe 38a. In FIG. 15, for the first direction of rotation, the first arm intermediate contact rod 51, a first arm contact surface 55 located between the first arm intermediate contact rod 51 and the arm attachment rod 53, and the contact teeth 54 are brought into contact with the pipe 38b, holding the pipe 38b, while the first arm outer contact rod 49 is concealed behind the second arm part 40. For the second direction of rotation, a retained pipe 38, 38a, 38b would be released.

As shown in detail in FIG. 15, the second arm part 40 comprises a hollow rod 62 that runs parallel to the hollow pivoting rod 48 of the first arm part 39, both hollow rods extending along the extension L. In the same way as in the first example, the cutter clamp 37 is in accordance with the present disclosure arranged for receiving the mounting rod 36 of a chain saw in one of the hollow rods 48, 62, such that the mounting rod 36 runs through a hollow rod 48, 62, enabling the guide bar 5 to pivot. As for the first example, where applicable in the Figures, only the guide bar 5 and the clutch cover 7 are shown, not the whole chain saw 1, even if the chain saw is to be understood to be present in its entirety.

Figure 16:
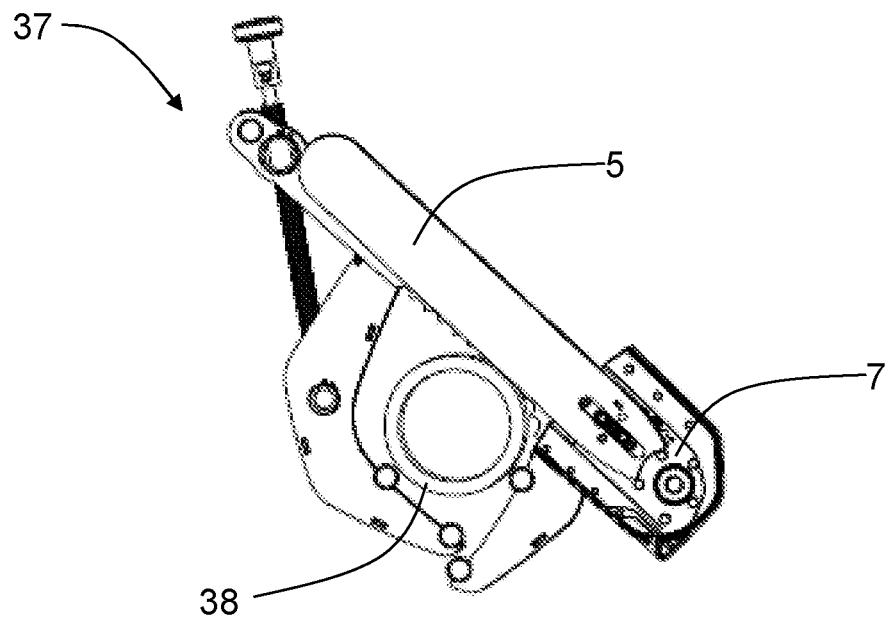
FIG. 16 shows a front view of a cutter clamp according to a second example where a mounted guide bar is pivoted in a first position.
Figure 17:
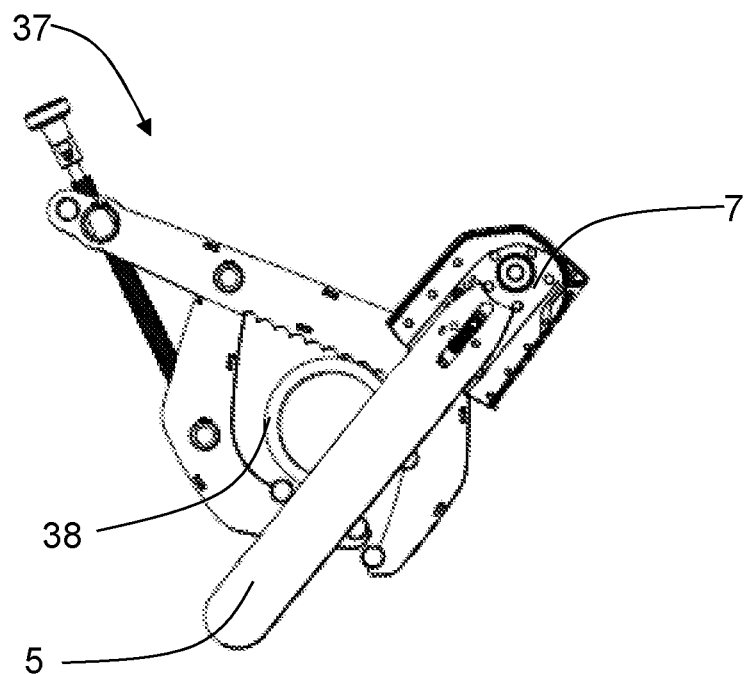
FIG. 17 shows a front view of a cutter clamp according to a second example where a mounted guide bar is pivoted in a second position.

When the chain saw 1 is attached to the cutter clamp 37, it can be pivoted such that it cuts the pipe in a desired manner as shown in FIG. 16 and FIG. 17.

The hollow rods 48, 62 here constitute attachment points, and in this example, as discussed above, the attachment points 48, 62 move since the arm parts 39, 40 are tightened against each other for the first direction of rotation of the locking screw 45. Each hollow rod 48, 62 moves relative the opposite arm part 39, 40 when the arms parts 39, 40 are adjusted. The smaller the pipe is, the closer to each other the attachment points 48, 62 are brought, the attachment points 48, 62 thus being automatically adapted to the current pipe dimension by being brought towards the center 64 when the cutter clamp 37 is tightened against the current pipe.

The arcuate arm parts 39, 40 are in the above each constituted by two arm plates 39a, 39b; 40a, 40b that are separated along the extension L, as in particular shown in FIG. 11 and FIG. 13, and are held in positions by means of the contact rods 49, 50; 51, 52 and additional arm plate holders 65, 66, 67 as illustrated in FIG. 13. The arcuate arm parts may of course be made in many other ways, for example in one piece of material.

In the above, two examples of cutter clamps 8, 37 have been presented. For both examples, the attachment points 21, 22; 48, 62 are automatically adapted to the current pipe dimension when the cutter clamp 8, 37 is tightened against the current pipe as described above. The cutter clamp 8, 37 according to the present disclosure comprises a first arm part 10, 39 and a second arm part 11, 40, where the arm parts 10, 11; 39, 40 are arcuate and arranged to adjustably at least partially enclose a major part of a circumference 57, 63 having a center 58, 64. The adjustment of the arms is performed by means of a locking screw 14, 45.

The cutter clamp 8, 37 comprises two hollow rods 21, 22; 48, 62, one arranged at each arm part 10, 11; 39, 40, where the hollow rods 21, 22; 48, 62 are arranged for receiving a mounting rod 36 of a power cutter in a pivoting manner. The smaller circumference the arm parts are adjusted for, the closer to the center 58, 64 the hollow rods 21, 22; 48, 62 are moved. The cutter clamp has been shown to comprise two hollow rods 21, 22; 48, 62, but of course there may be only one such hollow rod arranged at one of the arcuate arms, or even more.

Figure 18:
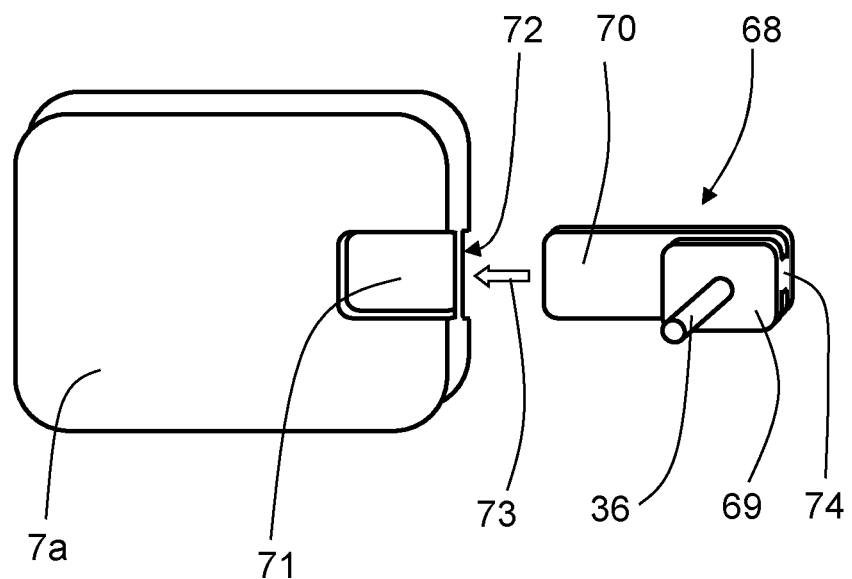
FIG. 18 shows a schematic perspective view of an attachment device that is about to be mounted to a clutch cover.
Figure 19:
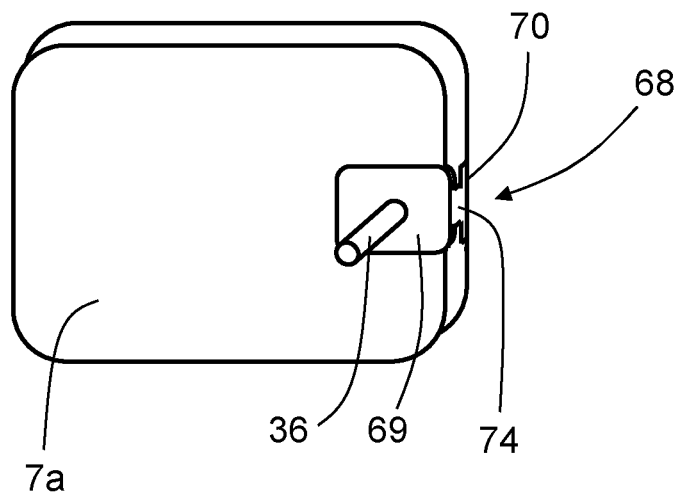
FIG. 19 shows a schematic perspective view of an attachment device that is mounted to a clutch cover.

According to some aspects, with reference to FIG. 18 and FIG. 19, the mounting rod 36 is attached to a rod attachment device 68 which in turn comprises a first leg part 69 and a second leg part 70 which are separated by an intermediate part 74. The clutch cover 7a here comprises a first indentation 71 and a second indentation 72, her in the form of millings, where the indentations 71, 72 are positioned on opposite sides of the clutch cover 7a and are adapted to receive the corresponding leg parts 69, 70 when these are slid into the indentations 71, 72 along a mounting direction 73.

Figure 20:
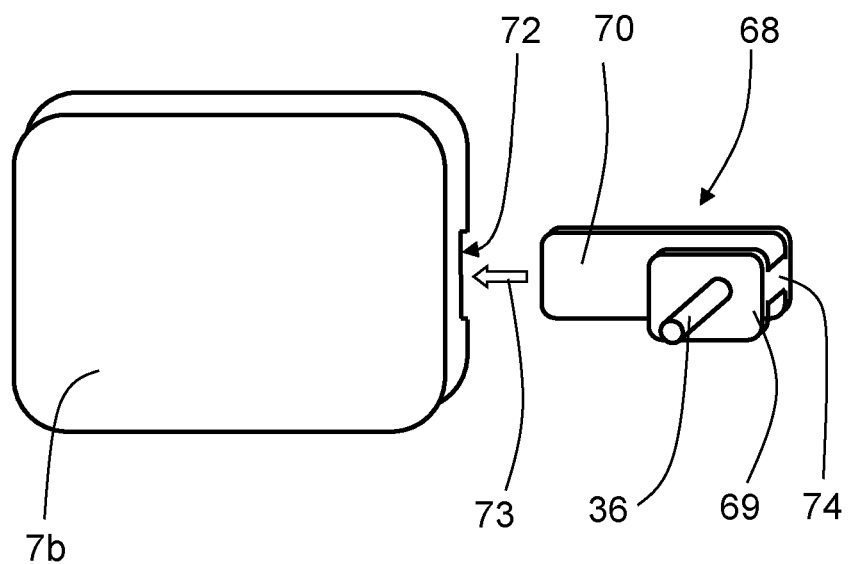
FIG. 20 shows a schematic perspective view of an attachment device that is about to be mounted to a clutch cover according to an alternative.

Since the leg parts 69, 70 have a tight fitting in the indentations 71, 72, the attachment device 68 can be rigidly fastened to the clutch cover 7a as shown in FIG. 20. The leg parts 69, 70 are shown to be of different lengths along the mounting direction 73, where the indentations 71, 72 suitably have corresponding lengths. The lengths of the leg parts 69, 70 can of course have any suitable relations, according to some aspects the leg parts 69, 70 have the same length.

The rod attachment device 68 is according to some aspects suitable for attaching other types of mounting rods, or any types of suitable mounting parts, to a power cutter. The rod attachment device 68 is therefore generally constituted by an attachment device 68, and suitable mounting parts are according to some aspects adapted to be fastened to a wall-mounted saw holder.

An alternative is shown in FIG. 20, where an alternative clutch cover 7b only comprises one indentation 72 which according to some aspects is sufficient for rigidly fastening the attachment device 68 to the clutch cover 7b.

Each indentations 71, 72 is according to some aspects constituted by any form of suitable leg holding arrangement. Screws, spring-loaded balls or similar are according to some aspects arranged in at least one leg holding arrangement for securing the corresponding leg part.

Figure 21:
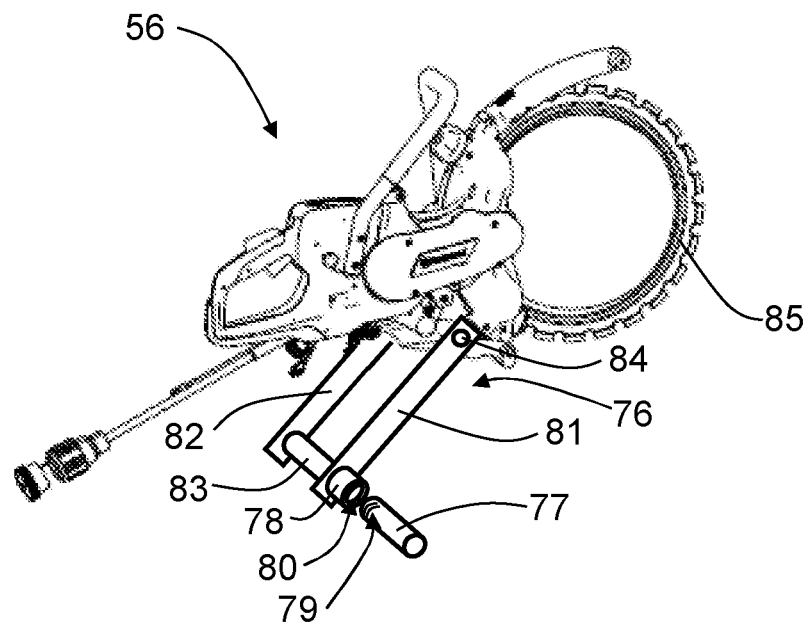
FIG. 21 shows a perspective view of a holding frame, according to first example, that is attached to a ring saw.

With reference to FIG. 21, a cutter clamp according to the present disclosure can also be used for a ring saw 56. Here, a holding frame 76 according to a first example is attached to the ring saw 56. The holding frame 76 comprises a first leg part 81 and a second leg part 82 which are separated by an intermediate part 83. The leg parts 81, 82 are fastened to the ring saw 56 by means of suitable fastening means 84 on opposite sides of the ring saw 56 with respect to a cutting plane of a ring saw blade 85.

The holding frame 76 comprises an attachment flange 78 that is attached to the first leg part 81 and is arranged for releasably attaching a mounting rod 77 to the holding frame 76. The mounting rod 77 is in turn adapted to be received by a hollow rod 21, 22; 48, 62 of a cutter clamp 8, 37 according to the above.

According to some aspects, the mounting rod 77 has a treaded end 79, and the attachment flange 78 comprises corresponding inner threads 80. Other types of attachments are also conceivable, such as for example welding, press-fit or one or more spring-loaded balls.

The attachment flange 78 of the holding frame 76 is according to some aspects releasably attachable to other items, such as a previously known wall-mounted saw holding device.

Figure 22:
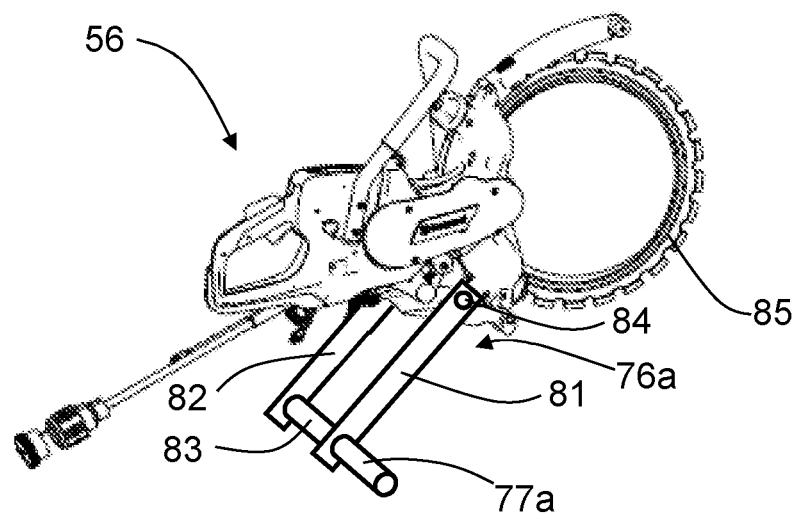
FIG. 22 shows a perspective view of a holding frame, according to second example, that is attached to a ring saw.

With reference to FIG. 22, there is an alternative holding frame 76a according to a second example where a mounting rod 77a is directly attached to the first leg part 81 in a fixed manner. The mounting rod 77a is according to some aspects comprised in an extended intermediate part 83 that protrudes via the first leg part 81.

According to some aspects, with reference to FIG. 10-15, the second arm part 40 of the cutter clamp 37 according to the second example comprises a further hollow rod 75 positioned between the first screw holder 46 and the second arm second end 44. This further hollow rod 75 can also be adapted for receiving a mounting rod 36 of a power cutter in a pivoting manner. This further hollow rod 75 is especially suitable for receiving a mounting rod of a ring saw according to the above. Such a cutter clamp is evidently versatile and possible to use for different types of power cutters.

Figure 23:
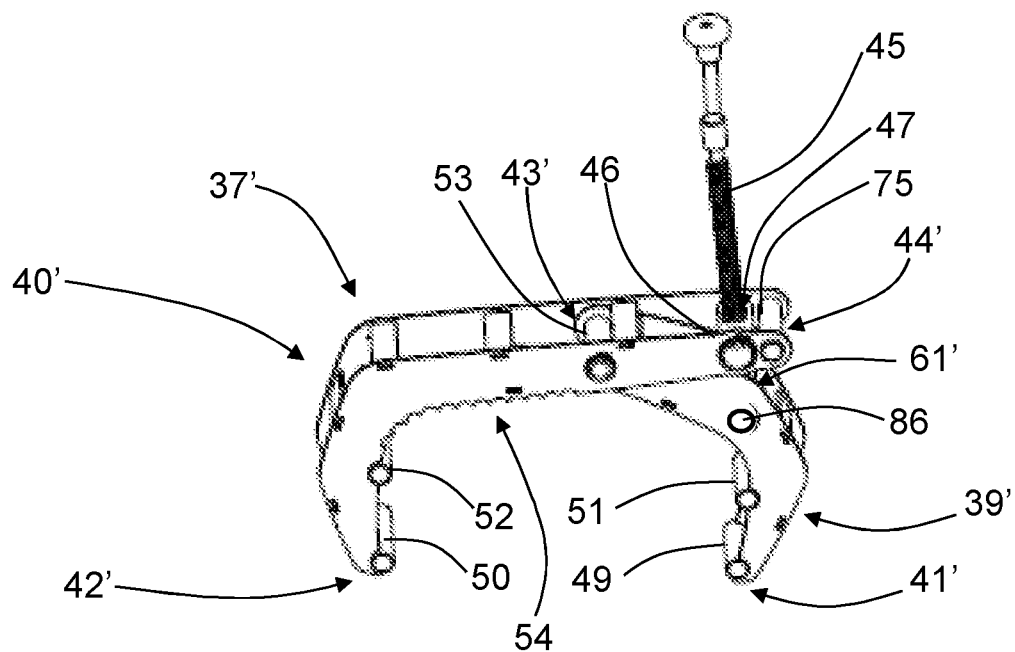
FIG. 23 shows a top perspective view of a cutter clamp with only one hollow rod.

According to some aspects with reference to FIG. 23, which corresponds to FIG. 11, an alternative cutter clamp 37' is shown. Here, alternative arm parts 39', 40' are shown, where only the further hollow rod 75 is comprised in the cutter clamp 37'. No other hollow rod that is adapted for receiving a mounting rod 36 of a power cutter in a pivoting manner is comprised in the cutter clamp 37'. This cutter clamp 37' is especially suitable for a ring saw according to the above.

The cutter clamp 37' comprises a locking screw 45 that is rotatably attached to a first screw holder 46 and is arranged to engage threads comprised in a second screw holder 61' such that turning the locking screw enables the adjustment of the arm parts 39', 40'. The arm parts 39', 40' comprise a corresponding first end 41', 42' and second end 43', 44', where a first arm second end 43' is attached to the second arm 40' in a pivoting manner by means of an arm attachment rod 53 between a second arm first end 42' and a second arm second end 44'. The hollow rod 75 is positioned between the first screw holder 46 and the second arm second end 44'.

The second screw holder 61' is concealed in FIG. 23, see the second screw holder 61 in FIG. 13 for an example of the second screw holder 61' in this example. Since there is no hollow pivoting rod to which the second screw holder 61' is attached, other means are conceivable for attaching the second screw holder 61'. In FIG. 23, an attachment rod 86 is shown to be comprised in the first arm part 39' and adapted for being attached to the second screw holder 61' in a manner similar to the one described with reference to FIG. 13, but other alternatives are of course conceivable.

Figure 24:
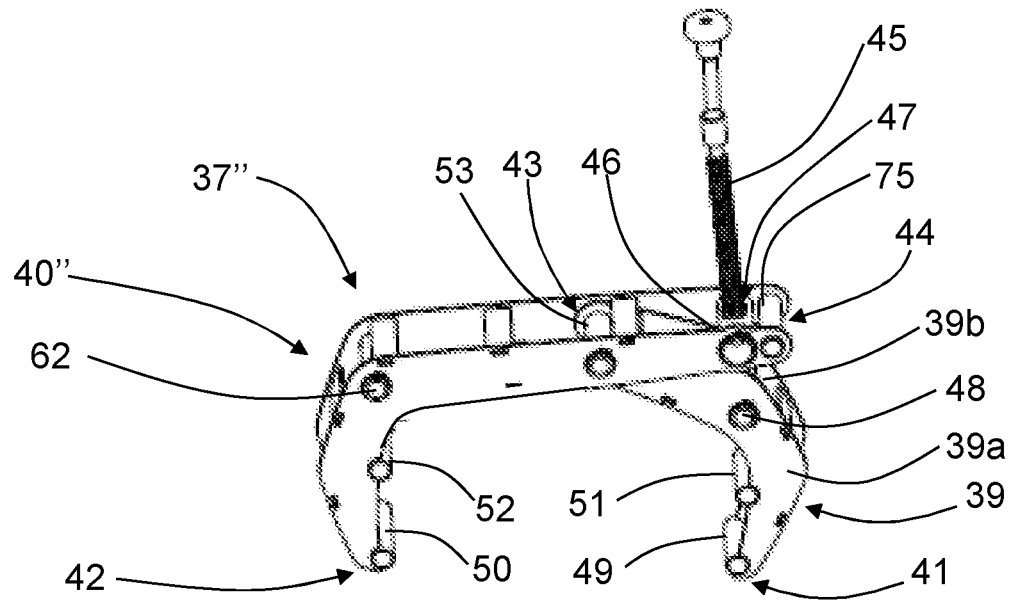
FIG. 24 shows a top perspective view of a cutter clamp without contact teeth.

According to some aspects with reference to FIG. 24, which corresponds to FIG. 11, an alternative cutter clamp 37" is shown. Here, an alternative second arm part 40" is shown without contact teeth.

The alternatives and alternative cutter clamps 37, 37', 37" disclosed can naturally be combined in any suitable manner.

The present disclosure is not limited to the examples described above, but may vary freely within the scope of the appended claims. For example, the cutter clamp 8, 37 is not only suitable for a chain saw or ring saw, but also other types of power cutters that are suitable for cutting pipes are suitable for attachment to a cutter clamp 8, 37 according to the present disclosure. The same cutter clamp 8, 37 can according to some aspects be used for both a chain saw and a ring saw 56 as well as for other types of power cutters.

In this context, expressions such as parallel are not intended to be interpreted as mathematically exact, but within what normally is practically obtainable.

The cutter clamp 8, 37 may be made in any suitable material, where the arm parts for example can be made of metal plates, molded metal or molded plastic.

According to some aspects, the intermediate parts 12, 13 that connect the arm parts 10, 11 in the first example can be formed in many ways, there do not to have to be any outer plates. According to some aspects, one intermediate part 12 comprises the first screw holder 19 and the hollow rods 21, 22, while the other intermediate part 13 comprises the second screw holder 25. For the first example, the hollow rods 21, 22 move relative the rest of the cutter clamp 8 and the pipe 9 that is to be retained by means of the elongated slots 15, 16 formed in the arm parts.

The cutter clamps 8, 37, 37', 37" described are not only suitable when cutting through pipes, but many other items can easily be cut with the help of a cutter clamp 8, 37, 37', 37" according to the present disclosure.

The chain saw 1 comprises a motor 2 which can be constituted by a combustion engine or an electric motor.

Depending on the type of power cutter and type of motor, there may not be any clutch comprised in the power transferring arrangement. There is normally always some kind of transmission means for transferring power from the motor 2 to the saw chain 6 or saw blade 85, and generally the clutch covers described are constituted by a power transfer cover.

According to some aspects, the power cutter comprises the mounting rod 36, alternatively, the mounting rod 36 can be comprised in an attachment device 68 as described above. According to some aspects, the mounting rod is comprised in the cutter clamp. Generally, irrespective of which alternative that is used, there is a mounting rod 36 for a power cutter.

Generally, the present disclosure relates to a cutter clamp 8, 37 that comprises a first arm part 10, 39 and a second arm part 11, 40, where the arm parts 10, 11; 39, 40 are arcuate and arranged to adjustably at least partially enclose a major part of a circumference 57, 63 having a center 58, 64, where the cutter clamp 8, 37 comprises at least one hollow rod 21, 22; 48, 62 arranged for receiving a mounting rod 36 for a power cutter 1, 56 in a pivoting manner. The smaller circumference the arm parts 10, 11; 39, 40 are adjusted for, the closer to the center 58, 64 said hollow rod 21, 22; 48, 62 is moved.

According to some aspects, the cutter clamp 8, 37 comprises a locking screw 14, 45 that is rotatably attached to a first screw holder 19, 46 and is arranged to engage threads comprised in a second screw holder 25, 61 such that turning the locking screw enables the adjustment of the arm parts 10, 11; 39, 40.

According to some aspects, the cutter clamp 8 comprises a first intermediate part 12 and a second intermediate part 13, where the intermediate parts 12, 13 connect the arm parts 10, 11, and where the locking screw 14 at least partly runs via the intermediate parts 12, 13.

According to some aspects, one intermediate part 12 comprises the first screw holder 19 and said hollow rod 21, 22, while the other intermediate part 13 comprises the second screw holder 25.

According to some aspects, when the arm parts 10, 11 are adjusted, each hollow rod 21, 22 moves relative the rest of the cutter clamp 8 by sliding in a corresponding elongated slot 15, 16 formed in a corresponding arm part 10, 11.

According to some aspects, the arm parts 39, 40 comprise a corresponding first end 41, 42 and second end 43, 44, where a first arm second end 43 is attached to the second arm 40 in a pivoting manner by means of an arm attachment rod 53 between a second arm first end 42 and a second arm second end 44.

According to some aspects, the second arm part 40 comprises the first screw holder 46 positioned between the first arm second end 43 and the second arm second end 44, where the first arm part 39 comprises a hollow pivoting rod 48 that in turn is attached to the second screw holder 61.

According to some aspects, each hollow rod 48, 62 is attached to a corresponding arm part 39, 40, such when the arm parts 39, 40 are adjusted, said hollow rod 48, 62 moves relative the opposite arm part 39, 40.

According to some aspects, the second arm part 40 comprises a further hollow rod 75 positioned between the first screw holder 46 and the second arm second end 44.

Generally, the present disclosure also relates to a cutter clamp 37' that comprises a first arm part 39' and a second arm part 40', where the arm parts 39', 40' are arcuate and arranged to adjustably at least partially enclose a major part of a circumference 63 having a center 64, where the cutter clamp 37' comprises one hollow rod 75 arranged for receiving a mounting rod 36 for a power cutter 1, 56 in a pivoting manner. The cutter clamp 37' comprises a locking screw 45 that is rotatably attached to a first screw holder 46 and is arranged to engage threads comprised in a second screw holder 61' such that turning the locking screw enables the adjustment of the arm parts 39', 40', where the arm parts 39', 40' comprise a corresponding first end 41', 42' and second end 43', 44', where a first arm second end 43' is attached to the second arm 40' in a pivoting manner by means of an arm attachment rod 53 between a second arm first end 42' and a second arm second end 44', where the hollow rod 75 is positioned between the first screw holder 46 and the second arm second end 44'.

According to some aspects, the second arm part 40' comprises the first screw holder 46' positioned between the first arm second end 43' and the second arm second end 44', where the first arm part 39' comprises an attachment rod 86 that is attached to the second screw holder 61'.

According to some aspects, the second arm part 40' comprises contact teeth 54 arranged to contact a pipe.

According to some aspects, the hollow rod 75 is arranged for receiving a ring saw mounting rod 77 releasably attached to a holding frame 76, where the holding frame 76 comprises a first leg part 81 and a second leg part 82 which are separated by an intermediate part 83, where the leg parts 81, 82 are adapted to be fastened to a ring saw 56 on opposite sides of the ring saw 56 with respect to a cutting plane of a ring saw blade 85, where the holding frame 76 comprises an attachment flange 78 that is attached to the first leg part 81, where the attachment flange 78 is arranged to be releasably attached to the mounting rod 77.

According to some aspects, the hollow rod 75 is arranged for receiving a ring saw mounting rod 77a attached to a holding frame 76a, where the holding frame 76a comprises a first leg part 81 and a second leg part 82 which are separated by an intermediate part 83, where the leg parts 81, 82 are adapted to be fastened to a ring saw 56 on opposite sides of the ring saw 56 with respect to a cutting plane of a ring saw blade 85, where the holding frame 76a comprises a mounting rod 77a that is directly attached to the first leg part 81 in a fixed manner.

Generally, the present disclosure also relates to an attachment device 68 adapted for attaching a mounting part 36 to a power transfer cover 7a, 7b for a power cutter 1. The attachment device 68 comprises a first leg part 69 and a second leg part 70, which leg parts 69, 70 are separated by an intermediate part 74, where the mounting part 36 is attached to the first leg part 69, where furthermore the leg parts 69, 70 are adapted to be positioned on opposite sides of the power transfer cover 7a, 7b such that at least one leg part 69, 70 is received and retained by a corresponding leg holding arrangement 71, 72.

According to some aspects, the mounting part 36 is constituted by a mounting rod that is adapted to be connected to a cutter clamp 8, 37, 37', 37" according to the above.

Generally, the present disclosure also relates to a cutter clamp kit, where the cutter clamp kit comprises a cutter clamp 8, 37, 37', 37" and a power transfer cover 7a, 7b according to the above.

Generally, the present disclosure also relates to a holding frame 76 adapted to be attached to a ring saw 56. The holding frame 76 comprises a first leg part 81 and a second leg part 82, which leg parts 81, 82 are separated by an intermediate part 83, where the leg parts 81, 82 are adapted to be fastened to a ring saw 56 on opposite sides of the ring saw 56 with respect to a cutting plane of a ring saw blade 85, where the holding frame 76 comprises an attachment flange 78 that is attached to the first leg part 81, where the attachment flange 78 is arranged to be releasably attached to a mounting rod 77 that is adapted to be connected to a cutter clamp 8, 37, 37', 37" according to the above.

According to some aspects, the mounting rod 77 has a treaded end 79, and the attachment flange 78 comprises corresponding inner threads 80.

Generally, the present disclosure also relates to holding frame 76a adapted to be attached to a ring saw 56. The holding frame 76a comprises a first leg part 81 and a second leg part 82, which leg parts 81, 82 are separated by an intermediate part 83, where the leg parts 81, 82 are adapted to be fastened to a ring saw 56 on opposite sides of the ring saw 56 with respect to a cutting plane of a ring saw blade 85, where the holding frame 76a comprises a mounting rod 77a that is directly attached to the first leg part 81 in a fixed manner, where the mounting rod 77a is adapted to be connected to a cutter clamp 8, 37, 37', 37" according to the above.

The invention claimed is:

1. A cutter clamp that comprises a first arm part and a second arm part, where the first and second arm parts are arcuate and arranged to adjustably at least partially enclose a major part of a circumference having a center, wherein the cutter clamp comprises a hollow rod arranged for receiving a mounting rod for a power cutter in a pivoting manner, wherein the smaller circumference the first and second arm parts are adjusted for, the closer to the center said hollow rod is moved, wherein the first and second arm parts comprise a corresponding first end and a second end, wherein a first arm second end is attached to the second arm in a pivoting manner by means of an arm attachment rod between a second arm first end and a second arm second end.

2. The cutter clamp according to claim 1, wherein the second arm part comprises a first screw holder positioned between the first arm second end and the second arm second end, and wherein the first arm part comprises a hollow pivoting rod that in turn is attached to a second screw holder.

3. The cutter clamp according to claim 2, wherein the hollow rod is attached to a corresponding one of the first arm part or the second arm part, such that when the first arm part is adjusted, the hollow rod moves relative to the second arm part.

4. The cutter clamp according to claim 2, wherein the second arm part comprises a further hollow rod positioned between the first screw holder and the second arm second end.

5. A cutter clamp that comprises a first arm part and a second arm part, wherein the first and second arm parts are arcuate and arranged to adjustably at least partially enclose a major part of a circumference having a center, wherein the cutter clamp comprises a hollow rod arranged for receiving a mounting rod for a power cutter in a pivoting manner, wherein the cutter clamp comprises a locking screw that is rotatably attached to a first screw holder and is arranged to engage threads comprised in a second screw holder such that turning the locking screw enables adjustment of the first and second arm parts, wherein the first and second arm parts comprise a corresponding first end and second end, wherein a first arm second end is attached to the second arm in a pivoting manner by means of an arm attachment rod between a second arm first end and a second arm second end, wherein the hollow rod is positioned between the first screw holder and the second arm second end.

6. The cutter clamp according to claim 5, wherein the second arm part comprises the first screw holder positioned between the first arm second end and the second arm second end, wherein the first arm part comprises an attachment rod that is attached to the second screw holder.

7. The cutter clamp according to claim 5, wherein the second arm part comprises contact teeth arranged to contact a pipe.

8. A cutter clamp that comprises a first arm part and a second arm part, wherein the first and second arm parts are arcuate and arranged to adjustably at least partially enclose a major part of a circumference having a center, wherein the cutter clamp comprises a hollow rod arranged for receiving a mounting rod for a power cutter in a pivoting manner, wherein the smaller circumference the arm parts are adjusted for, the closer to the center said hollow rod is moved, wherein the cutter clamp comprises a first intermediate part and a second intermediate part, wherein the first and second intermediate parts connect the first and second arm parts, and wherein a locking screw at least partly runs via the first and second intermediate parts, and when the arm parts are adjusted, the hollow rod moves relative to the first and second arm parts by sliding in a corresponding elongated slot formed in a corresponding one of the first arm part of the second arm part.

9. The cutter clamp according to claim 8, wherein the cutter clamp comprises a locking screw that is rotatably attached to a first screw holder and is arranged to engage threads comprised in a second screw holder such that turning the locking screw enables the adjustment of the first and second arm parts.

10. The cutter clamp according to claim 9, wherein the first intermediate part comprises the first screw holder and said hollow rod, while the second intermediate part comprises the second screw holder.

11. An attachment device adapted for attaching a mounting part to a power transfer cover for a power cutter, wherein the attachment device comprises a first leg part and a second leg part, the first and second leg parts being separated by an intermediate part, wherein the mounting part is attached to the first leg part, wherein furthermore the first and second leg parts are adapted to be positioned on opposite sides of the power transfer cover such that at least one of the first leg part or the second leg part is received and retained by a corresponding leg holding arrangement.

12. The attachment device according to claim 11, wherein the mounting part comprises a mounting rod that is adapted to be connected to a cutter clamp that comprises a first arm part and a second arm part, where the first and second arm parts are arcuate and arranged to adjustable at least partially enclose a major part of a circumference having a center, wherein the cutter clamp comprises a hollow rod arranged for receiving a mounting rod for a power cutter in a pivoting manner, wherein the smaller circumference the first and second arm parts are adjust for, the closer to the center said hollow rod is moved, wherein the first and second arm parts comprise a corresponding first end and a second end, wherein a first arm second end is attached to the second arm in a pivoting manner by means of an arm attachment rod between a second arm first end and a second arm second end.

13. A cutter clamp kit, wherein the cutter clamp kit comprises the cutter clamp according to claim 1, a power transfer cover and an attachment device.

14. A holding frame adapted to be attached to a ring saw, wherein the holding frame comprises a first leg part and second leg part, wherein the first and second leg parts are separated by an intermediate part, wherein the first and second leg parts are adapted to be fastened to the ring saw on opposite sides of the ring saw with respect to a cutting plane of a ring saw blade, wherein the holding frame comprises an attachment flange that is attached to the first leg part, wherein the attachment flange is arranged to be releasably attached to a mounting rod that is adapted to be connected to a cutter clamp comprising a hollow rod arranged for receiving the mounting rod.

15. A holding frame according to claim 14, wherein the mounting rod has a threaded end, and the attachment flange comprises corresponding inner threads.

16. A holding frame adapted to be attached to a ring saw, wherein the holding frame comprises a first leg part and a second leg part, the first and second leg parts are separated by an intermediate part wherein the first and second leg parts are adapted to be fastened to the ring saw on opposite sides of the ring saw with respect to a cutting plane of a ring saw blade, wherein the holding frame comprises a mounting rod that is directly attached to the first leg part in a fixed manner, wherein the mounting rod is adapted to be connected to a cutter clamp comprising a hollow rod arranged for receiving the mounting rod.

\* \* \* \* \*